US008740317B2

(12) United States Patent
Wu et al.

(10) Patent No.: US 8,740,317 B2
(45) Date of Patent: Jun. 3, 2014

(54) CLOSED-LOOP CONTROL FOR TRAILER SWAY MITIGATION

(75) Inventors: Hsien-cheng Wu, Novi, MI (US); Flavio Nardi, Farmington Hills, MI (US); Jin-Jae Chen, Canton, MI (US); Eric Hartman, New Hudson, MI (US)

(73) Assignee: Robert Bosch GmbH, Stuttgart (DE)

( * ) Notice: Subject to any disclaimer, the term of this patent is extended or adjusted under 35 U.S.C. 154(b) by 1694 days.

(21) Appl. No.: 11/503,875

(22) Filed: Aug. 11, 2006

(65) Prior Publication Data
US 2008/0036296 A1 Feb. 14, 2008

(51) Int. Cl.
*B60T 8/1755* (2006.01)
*B60T 8/24* (2006.01)

(52) U.S. Cl.
USPC .......................................... 303/123; 303/146

(58) Field of Classification Search
USPC ................. 303/7, 123, 140, 146–147; 701/83
See application file for complete search history.

(56) References Cited

U.S. PATENT DOCUMENTS

| | | | |
|---|---|---|---|
| 4,023,863 | A | 5/1977 | Sisson et al. |
| 4,034,822 | A | 7/1977 | Stedman |
| RE30,550 | E | 3/1981 | Reise |
| 4,254,998 | A | 3/1981 | Marshall et al. |
| 4,275,898 | A | 6/1981 | Llambrich |
| 4,697,817 | A | 10/1987 | Jefferson |
| 4,706,984 | A | 11/1987 | Esler et al. |
| 4,850,249 | A | 7/1989 | Kirstein |
| 5,011,170 | A | 4/1991 | Forbes et al. |
| 5,139,374 | A | 8/1992 | Holt et al. |
| 5,333,940 | A | 8/1994 | Topfer |
| 5,348,331 | A | 9/1994 | Hawkins |
| 5,380,072 | A | 1/1995 | Breen |
| 5,671,982 | A | 9/1997 | Wanke |
| 5,707,071 | A | 1/1998 | Prestidge et al. |
| 5,747,683 | A | 5/1998 | Gerum et al. |
| 5,799,745 | A | 9/1998 | Fukatani |
| 5,861,802 | A | 1/1999 | Hungerink et al. |
| 5,986,544 | A | 11/1999 | Kaisers et al. |

(Continued)

FOREIGN PATENT DOCUMENTS

| | | |
|---|---|---|
| DE | 19964048 | 1/2001 |
| DE | 10212582 A1 | 9/2003 |

(Continued)

OTHER PUBLICATIONS

SAE Technical Paper Series, Parametric Study on Vehicle-Trailer Dynamics for Stability Control; SAE International, Warrendale, PA; Copyright 2003.

(Continued)

*Primary Examiner* — Anna Momper
(74) *Attorney, Agent, or Firm* — Michael Best & Friedrich LLP

(57) ABSTRACT

A method, and a system using the method, of controlling a towing vehicle that is connected to a vehicle trailer. The method includes sensing a set of vehicle targets and a set of vehicle conditions in response to the set of vehicle targets. The method also includes determining a plurality of differences between the set of vehicle targets and the set of vehicle conditions, determining a trend of the plurality of differences, generating at least one of a symmetric signal and an asymmetric signal based on the trend, and actuating a vehicle system with the at least one of a symmetric signal and an asymmetric signal.

24 Claims, 7 Drawing Sheets

(56) References Cited

U.S. PATENT DOCUMENTS

| | | | |
|---|---|---|---|
| 6,012,780 A | 1/2000 | Duvernay | |
| 6,042,196 A | 3/2000 | Nakamura et al. | |
| 6,074,020 A | 6/2000 | Takahashi et al. | |
| 6,219,610 B1 * | 4/2001 | Araki | 701/72 |
| 6,223,114 B1 | 4/2001 | Boros et al. | |
| 6,234,447 B1 | 5/2001 | Boyden et al. | |
| 6,272,407 B1 | 8/2001 | Scholl | |
| 6,311,111 B1 | 10/2001 | Leimbach et al. | |
| 6,349,247 B1 | 2/2002 | Schramm et al. | |
| 6,438,464 B1 | 8/2002 | Woywod et al. | |
| 6,446,998 B1 | 9/2002 | Koenig et al. | |
| 6,450,019 B1 | 9/2002 | Wetzel et al. | |
| 6,452,485 B1 | 9/2002 | Schutt et al. | |
| 6,466,028 B1 | 10/2002 | Coppinger et al. | |
| 6,494,281 B1 | 12/2002 | Faye et al. | |
| 6,498,977 B2 | 12/2002 | Wetzel et al. | |
| 6,501,376 B2 | 12/2002 | Dieckmann et al. | |
| 6,516,260 B2 | 2/2003 | Wetzel et al. | |
| 6,522,956 B2 | 2/2003 | Hecker et al. | |
| 6,523,911 B1 * | 2/2003 | Rupp et al. | 303/7 |
| 6,553,284 B2 | 4/2003 | Holst et al. | |
| 6,600,974 B1 | 7/2003 | Traechtler | |
| 6,604,035 B1 | 8/2003 | Wetzel et al. | |
| 6,636,047 B2 | 10/2003 | Arit et al. | |
| 6,655,710 B2 | 12/2003 | Lindell et al. | |
| 6,668,225 B2 | 12/2003 | Oh et al. | |
| 6,756,890 B1 | 6/2004 | Schramm et al. | |
| 6,959,970 B2 | 11/2005 | Tseng | |
| 7,125,086 B2 * | 10/2006 | Tanaka et al. | 303/190 |
| 7,226,134 B2 | 6/2007 | Horn et al. | |
| 7,272,481 B2 * | 9/2007 | Einig et al. | 701/70 |
| 7,561,953 B2 | 7/2009 | Yu | |
| 7,917,274 B2 | 3/2011 | Hackney et al. | |
| 8,060,288 B2 | 11/2011 | Choby | |
| 2003/0171865 A1 | 9/2003 | Moser et al. | |
| 2004/0249547 A1 | 12/2004 | Nenninger | |
| 2005/0006946 A1 | 1/2005 | Traechtler et al. | |
| 2005/0065694 A1 | 3/2005 | Nenninger | |
| 2005/0125132 A1 | 6/2005 | Stumpp et al. | |
| 2005/0206229 A1 | 9/2005 | Lu et al. | |
| 2006/0025896 A1 | 2/2006 | Traechtler et al. | |
| 2006/0033308 A1 | 2/2006 | Waldbauer et al. | |
| 2006/0125313 A1 | 6/2006 | Gunne et al. | |
| 2006/0155457 A1 | 7/2006 | Waldbauer et al. | |
| 2006/0204347 A1 | 9/2006 | Waldbauer et al. | |
| 2006/0229782 A1 | 10/2006 | Deng et al. | |
| 2006/0273657 A1 * | 12/2006 | Wanke et al. | 303/146 |
| 2007/0260385 A1 | 11/2007 | Tandy et al. | |
| 2008/0036296 A1 | 2/2008 | Wu et al. | |
| 2008/0172163 A1 | 7/2008 | Englert et al. | |
| 2009/0005946 A1 | 1/2009 | Futamura et al. | |
| 2009/0105906 A1 | 4/2009 | Hackney et al. | |
| 2009/0198425 A1 | 8/2009 | Englert | |
| 2009/0210112 A1 * | 8/2009 | Waldbauer et al. | 701/42 |
| 2009/0228182 A1 | 9/2009 | Waldbauer et al. | |
| 2009/0306861 A1 | 12/2009 | Schumann et al. | |

FOREIGN PATENT DOCUMENTS

| | | |
|---|---|---|
| DE | 102004040140A1 A1 | 2/2006 |
| EP | 1477338 A2 | 11/2004 |
| GB | 2402453 A | 8/2004 |
| WO | 2006/000578 A1 | 1/2006 |
| WO | WO 2006000578 A1 * | 1/2006 |

OTHER PUBLICATIONS

PCT/US2007/075561 International Search Report.
Office Action from European Patent Office for Application No. 07813932 dated May 20, 2009 (2 pages).
PCT/US2007/075561 International Preliminary Report on Patentability, 9 pages, dated Feb. 26, 2009.
Office Action from the European Patent Office for Application No. 07813932.6 dated Apr. 9, 2010 (4 pages).

* cited by examiner

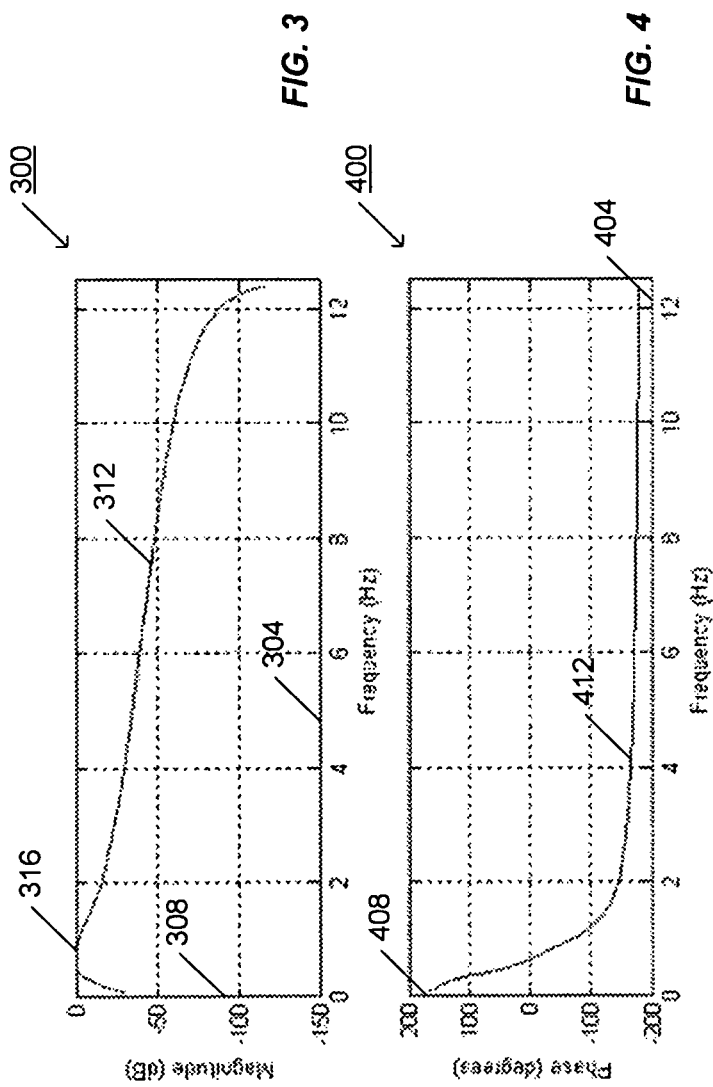

CLOSED-LOOP CONTROL FOR TRAILER SWAY MITIGATION

BACKGROUND

Embodiments of the invention relate to a method and device for controlling a motor vehicle towing a trailer.

Stability is a concern for a vehicle towing a trailer, especially when the towing vehicle is traveling at high speed or making a turn. Since the trailer significantly affects the dynamics of the towing vehicle, many control systems use techniques to improve the stability of the towing vehicle. For example, systems such as anti-lock braking systems ("ABS"), traction control systems ("TCS"), and vehicle dynamics control ("VDC") systems can be configured to perform different functions for the vehicle to improve stability.

Existing methods and systems for dampening trailer oscillations or improving stability generally require applying symmetric braking or torque by, through, or to the towing vehicle, followed by asymmetric braking or torque (again by, through, or to the towing vehicle) when the trailer oscillations are higher than a threshold. When these control methods and systems apply symmetric torque at an inappropriate time, the trailer can oscillate more. On the other hand, these control methods and systems typically start delivering the asymmetric torque to dampen oscillations when the trailer oscillates under certain circumstances. For example, some methods and systems will wait for a period of time after the trailer oscillation has reached a frequency threshold in order to deliver any symmetric or asymmetric torque. In other words, these control methods and systems allow the trailer to oscillate as long as the oscillations occur below the threshold. During this time, however, the oscillations can become severe and excessively damaging particularly when the towing vehicle is traveling at high speed.

SUMMARY

Accordingly, there is a need for improved methods and systems for controlling a towing vehicle that tows a trailer. The following summary sets forth certain embodiments of such methods and systems. However, it does not set forth all such embodiments and other embodiments are possible.

Generally, according to one form of the invention, a control system is first experimentally developed using parameters such as steering angle, yaw rate, vehicle speed, and lateral acceleration signals. These parameters are generally available within a vehicle control system such as an electronic stability program ("ESP") system. The control system also continuously receives parameters or signals from the vehicle control system, and compares the signals with parameters of the control system model. Based on the comparison, a suitable type of braking is then selected to dampen the oscillations.

In another form, the invention provides a method of controlling a towing vehicle that is connected to a vehicle trailer. The method includes sensing a set of vehicle targets and a set of vehicle conditions in response to the set of vehicle targets. The method also includes determining a plurality of differences between the set of vehicle targets and the set of vehicle conditions, determining a trend of the plurality of differences, generating at least one of a symmetric signal and an asymmetric signal based on the trend, and actuating a vehicle system with the at least one of a symmetric signal and an asymmetric signal.

In another form, the invention provides a system for controlling a towing vehicle connected to a vehicle trailer. The system includes first and second sensors, a comparator, a trend module, a controller, and a vehicle system. The first sensor senses a set of vehicle targets for the towing vehicle, while the second sensor senses a set of vehicle conditions indicative of movements exhibited by the towing vehicle in response to the set of vehicle targets. The comparator determines a plurality of differences between the set of vehicle targets and the set of vehicle conditions. The trend module determines a trend of the plurality of differences, while the controller generates at least one of a symmetric signal and an asymmetric signal based on the trend. The vehicle system is actuated based on the at least one of a symmetric signal and an asymmetric signal.

In another form, the invention provides a method of controlling a towing vehicle connected to a vehicle trailer. The method includes determining a model of the towing vehicle based on a plurality of dynamics, sensing a set of vehicle targets for the towing vehicle, and sensing a set of vehicle conditions indicative of movements exhibited by the towing vehicle in response to the set of vehicle targets. The method also includes determining a switching signal with the model based on the set of vehicle targets and the set of vehicle conditions, and selectively applying at least one of a symmetric braking and an asymmetric braking based on the switching signal.

Other aspects of the invention will become apparent by consideration of the detailed description and accompanying drawings.

BRIEF DESCRIPTION OF THE DRAWINGS

FIG. 3 shows a magnitude response of a band-pass filter that can be applied in the oscillation control system of FIG. 2.

FIG. 4 shows a phase response of the band-pass filter of FIG. 3.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred solely due to the use of capitalization.

Embodiments of the invention relate to a method and system for controlling a motor vehicle connected to an oscillating trailer or semi-trailer. In one embodiment, a control system model is developed. The control system model compares signals received with parameters thereof. Based on the comparison, a suitable type of braking or torque is then selected to dampen the oscillations.

In a specific embodiment, a first set of vehicle conditions indicating a movement targeted for the towing vehicle is sensed. A second set of vehicle conditions indicating a movement exhibited by the towing vehicle in response to the first set of vehicle conditions is also sensed. Controller signals are then generated from the first and second sets of vehicle conditions. The controller signals are then used to selectively apply at least one of a symmetric braking and an asymmetric braking to dampen oscillations.

Figure 1:
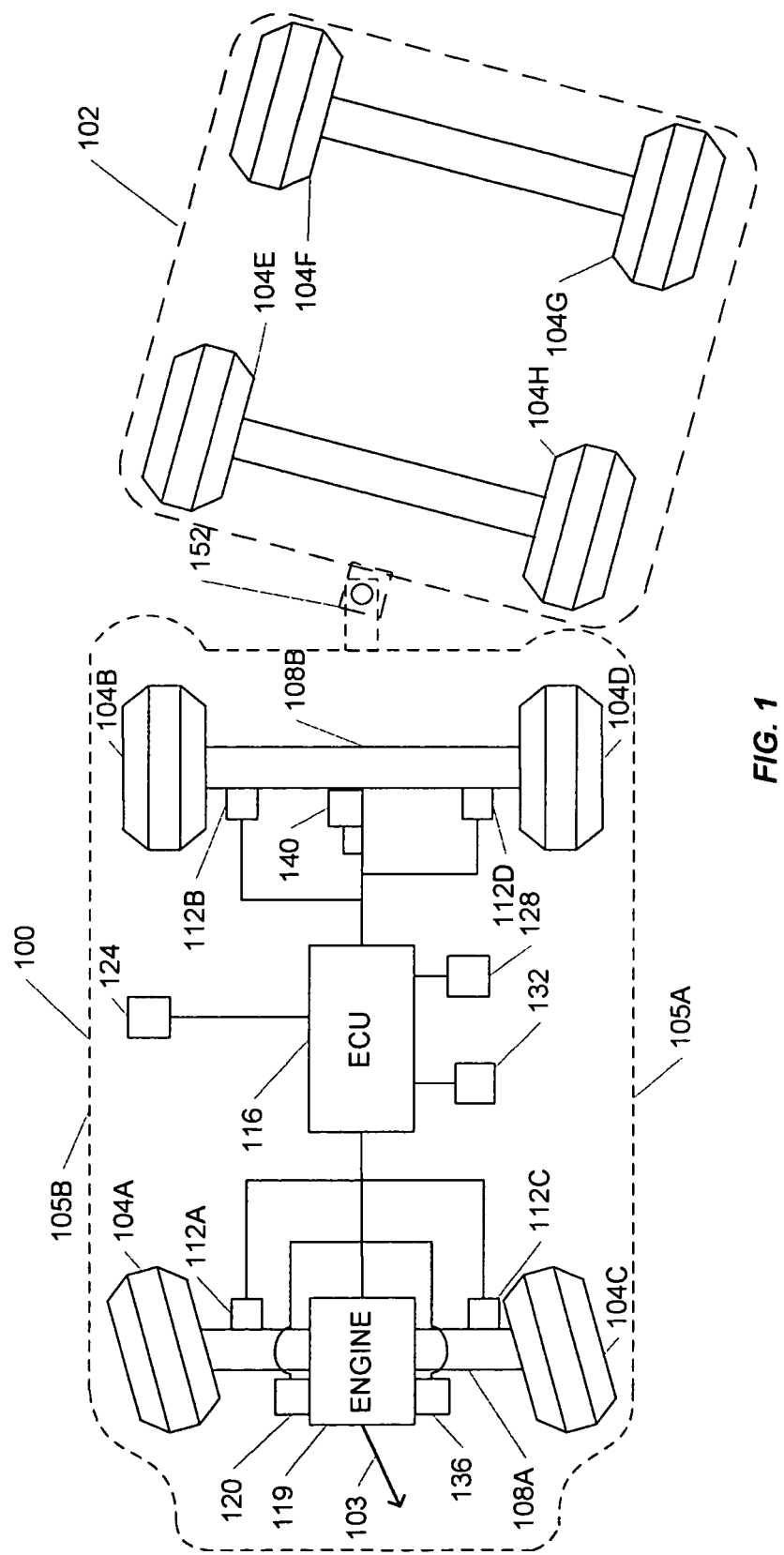
FIG. 1 shows a schematic plan view of a vehicle towing a trailer.

FIG. 1 shows a schematic plan view of a motor vehicle 100 towing a trailer 102 traveling in a direction indicated by arrow 103. The towing vehicle 100 has four wheels 104A, 104B, 104C and 104D, and the trailer 102 has four wheels 104E, 104F, 104G, and 104H. In FIG. 1, a driver (not shown) is assumed to be seated on a left side 105A of the vehicle 100. In other embodiments, the driver can seat on a right side 105B of the vehicle 100. The vehicle 100 and the trailer 102 can have other numbers of wheels. Furthermore, the trailer 102 can be a semi-trailer, a full-size trailer, a boat trailer, a camper, or the like. The wheels 104A, 104B, 104C, and 104D are connected to two axles 108A and 108B. The vehicle 100 also includes an engine 119. The four wheels are monitored by a plurality of wheel speed sensors 112A, 112B, 112C, and 112D. The wheel speed sensors 112A, 112B, 112C, and 112D communicate with an electronic processing unit ("ECU") 116.

The vehicle 100 also includes other sensors such as a steering angle sensor 120, a yaw rate sensor 124, and a lateral acceleration sensor 128. The wheel speed sensors 112A, 112B, 112C, the steering sensor 120, the yaw rate sensor 124, and the lateral acceleration sensor 128 are shown as individual sensors generically. These sensors 112A, 112B, 112C, 112D, 120, 124, and 128 can also include multiple sensors in a plurality of sensor arrays, for example, that may be coupled to the ECU 116. Other sensor types such as body slip angle sensor 132, an engine torque sensor 136, and various other sensors 140 can also be used in the vehicle 100. The vehicle 100 also includes a hitch 152 coupled to the trailer 102.

In some embodiments, sensors 112A, 112B, 112C, 112D, 120, 124, 128, 132, and 136 are parts of a sensor array embedded throughout the motor vehicle 100. The sensor array detects and monitors specific conditions of the vehicle 100. For example, sensors 112A, 112B, 112C, and 112D are used to sense a condition of the vehicle 100 that is indicative of a speed of the towing vehicle 100. Sensed conditions are then transduced and converted into calibrated signals that are indicative of the speed of the vehicle 100. For example, if the sensors 112A, 112B, 112C, and 112D are equipped with calibration circuitry or a processor, the speed can be converted internally to a calibrated form in the sensors. Otherwise, the conditions can be converted into calibrated signals by other external processes in a manner known in the art.

Furthermore, other sensors such as the steering sensor 120, the yaw rate sensor 124, and the lateral acceleration sensor 128 are used to detect of sense events such as side-to-side movements, side-to-side acceleration of the towing vehicle, and angles of the movements. Collectively, values of the signals outputted by sensors such as sensors 112A, 112B, 112C, 112D, 120, 124, and 128 are referred to as sensed values, or values, hereinafter. As a result, the ECU 116 can use data from existing sensors available to assist an internal or external oscillation control system to dampen oscillations exhibited by the trailer 102.

Figure 2:
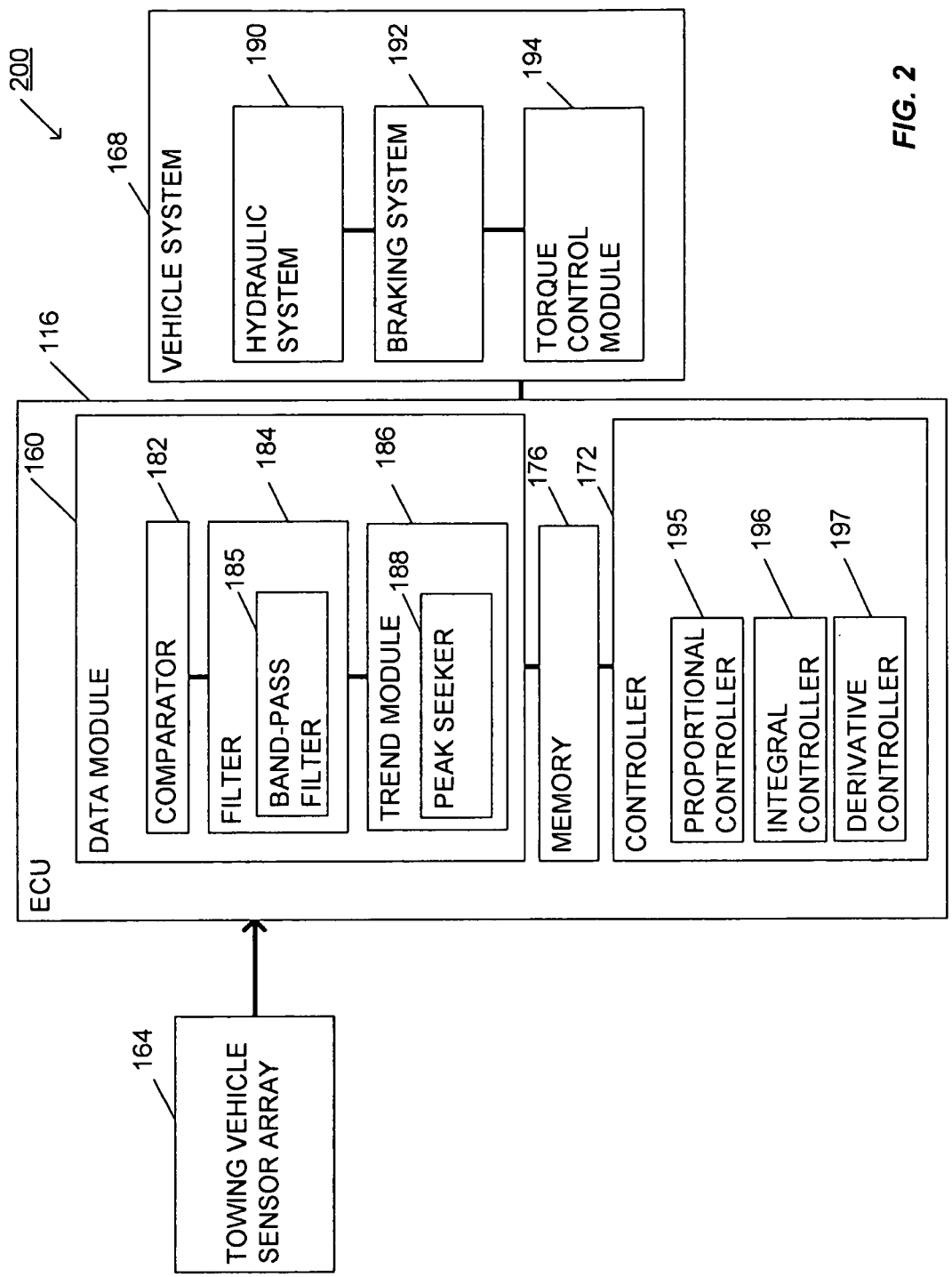
FIG. 2 shows a block diagram of an oscillation control system that can be applied in the vehicle of FIG. 1.

An exemplary oscillation control system 200 is shown in FIG. 2. In the embodiment shown, the control system 200 includes a data module 160 that is embedded in the ECU 116 and receives the values from a towing vehicle sensor array 164 that includes sensors 112A, 112B, 112C, 112D, 120, 124, 128, 132, 136, and the like. The ECU 116 is coupled to and communicates with a vehicle system 168, detailed hereinafter. A controller or processor 172 processes the values from the sensor array 164 according to a program stored in a memory 176.

Although the data module 160 is shown within the ECU 116, the system 200 can be designed with a distributed architecture where various components such as the data module 160 are located outside or remotely from other components such as the ECU 116. The data module 160 may also be integrated in other components such as the processor 172, or integrated in other control systems of the vehicle 100. Similarly, the memory 176 although shown external to the processor 172, can be internal to the processor 172.

The processor 172 can be a general-purpose micro-controller, a general-purpose microprocessor, a dedicated microprocessor or controller, a signal processor, an ASIC, or the like. In some embodiments, the data module 160 and its functions described are implemented in a combination of firmware, software, and hardware.

The data module 160 includes a comparator module 182, a filter module 184 that includes a band-pass filter 185, and a trend module 186 that includes a peak seeker module 188. As noted, in the embodiment shown, the ECU 116 communicates with the vehicle system 168. The vehicle system 168 includes a hydraulic system 190, a braking system 192, and a torque control module 194. As noted above, embodiments can be modified depending on whether a centralized or distributed architecture or some combination of the same is desired. Thus, hardware and software components of the hydraulic system 190, braking system 192, and torque control module 194 could be embedded in the ECU 116. It should be apparent that the hydraulic system 190, brake system 192, and torque control module can include a variety of mechanical components such as hydraulic lines, pumps, and fluid reservoirs; brake discs and pads; and an engine, a transmission, a drive shaft, and drive axles.

The data module 160 uses at least one mathematical or controller model of the towing vehicle 100 to simultaneously generate symmetric and asymmetric torque signals depending on vehicle dynamics. The model is experimentally determined with a plurality of vehicle dynamics or parameters measured at the sensor array 164 while the trailer 102 is oscillating. In some embodiments, the vehicle dynamics include a steering angle ($\delta_f$), a lateral acceleration ($a_y$), a wheel speed (v), a front wheel torque ($T_f$), a rear wheel torque ($T_r$), a body slip angle ($\beta$), and a yaw rate ($\dot{\psi}$). The model generated experimentally is described with a plurality of coefficients, detailed hereinafter.

In some embodiments, the coefficients of the model are stored in the memory 176 and processed by the processor 172.

In the embodiment shown, the controller model is based on a proportional-integral-derivative ("PID") controller model. Particularly, the processor 172 includes a proportional controller 195, an integral controller 196, and a derivative controller 197. However, other models such as a proportional controller model, a proportional-derivative ("PD") controller model, and a proportional-integral ("PI") controller model can also be used. Once the model has been determined, the data module 160 uses the model determined and the values obtained from the sensor array 164 to generate a symmetric signal or an asymmetric signal.

The ECU 116 determines a set of vehicle targets for the towing vehicle 100. Particularly, when the driver attempts to move the towing vehicle 100 in a certain direction, or at a certain speed, the driver inputs are sensed and signals indicative of the driver inputs are sent to the ECU 116. As a result, the ECU 116 determines a set of vehicle targets indicative of the driver inputs. For example, when the driver attempts to steer the towing vehicle 100 in a certain direction with a steering wheel, the ECU 116 generates a set of vehicle targets that corresponds to the steering angle the driver inputs. In some embodiments, the set of vehicle targets includes a set of yaw rates. As a result, the set of vehicle conditions includes a set of yaw rates actually exhibited by the towing vehicle 100 and a set of yaw rates corresponding to the steering angles detected by the sensor array 164.

Noise generated by the towing vehicle 100 and its surroundings can contaminate the vehicle conditions detected by the sensor array 164. As a result, the ECU 116 generally uses the filter module 184 to filter out the noise to obtain a set of filtered vehicle conditions. The ECU 116 then uses the comparator 182 to obtain a plurality of differences between the filtered vehicle conditions and the vehicle targets. When the vehicle conditions are yaw rates, such as when the towing vehicle 100 and the trailer 102 are yawing or oscillating, the plurality of differences represent a set of yaw rate errors between target yaw rates and exhibited yaw rates.

As noted, in some embodiments, the filter module 184 also includes the band-pass filter 185. In one embodiment, the band pass filter 185 has a general transfer function as shown in EQN. (1).

$$H(z) = \frac{B(z)}{A(z)} = \frac{b_0 + b_1 z^{-1} + b_2 z^{-2} + \ldots + b_n z^{-n}}{a_0 + a_1 z^{-1} + a_2 z^{-2} + \ldots + a_n z^{-n}} \quad (1)$$

wherein n is the order of the filter, and $a_i$ and $b_i$ are the i-th coefficients of the transfer functions. The plurality of filtered differences generally represent oscillations experienced by the trailer 102. In one specific embodiment, the band-pass filter 185 has filter characteristics of a second order (n=2) Butterworth band-pass filter having a transfer function as shown in EQN. (2)

$$H(z) = \frac{B(z)}{A(z)} = \frac{b_0 + b_1 z^{-1} + b_2 z^{-2}}{a_0 + a_1 z^{-1} + a_2 z^{-2}} \quad (2)$$

The band-pass filter 185 also has other filter characteristics such as a passband (or cutoff frequencies) from about 0.375 Hz to about 1.125 Hz, and a sampling rate of about 25 Hz (or a sampling period of about 0.04 seconds). To achieve the passband with the sampling rate as described, the coefficients can be determined in a manner known in the art. For example, the following transfer function coefficients were obtained using Matlab® tools: $a_0=1$; $a_1=-1.8029$; $a_2=0.8272$; $b_0=0.08636$; $b_1=0$; and $b_2=-0.08636$. If u(z) represents the plurality of differences or the yaw rate errors, the plurality of filtered differences represented by y(z), or BPAus, are determined as shown in EQN. (3).

$$y(z) = \frac{b_0 - b_1 z^{-1} + b_2 z^{-2}}{a_0 - a_1 z^{-1} + a_2 z^{-2}} \cdot u(z) \quad (3)$$

Other filter characteristics, filter types such as Chebyshev filters, tools, and coefficients can also be used depending on the applications and vehicles at hand.

FIG. 3 and FIG. 4 show frequency response plots of the second order band-pass filter with the filter characteristics as described. Particularly, FIG. 3 shows a magnitude response plot 300, wherein frequency values (in Hz) are measured along an x-axis 304 and magnitude values (in dB) are measured along a y-axis 308. Particularly, curve 312 represents the magnitude response of the second order band-pass filter. Curve 312 also shows a substantially flat passband 316 ranging from about 0.375 Hz to about 1.125 Hz. Similarly, FIG. 4 shows a phase response plot 400, wherein frequency values (in Hz) are measured along an x-axis 404 and phase values (in degrees) are measured along a y-axis 408. Curve 412 represents the frequency response of the second order band-pass filter. Curve 412 also has an essentially linear phase response within the passband 316.

If the plurality of filtered differences are positive, the trailer is considered as swaying toward the right side 105B of the vehicle 100. In such a case, wheels 104C and 104D are considered outside wheels, and wheels 104A and 104B are considered inside wheels. Conversely, if the plurality of filtered differences are negative, the trailer is considered as swaying toward the left side 105A of the vehicle 100. In such a case, wheels 104C and 104D are considered inside wheels, and wheels 104A and 104B are considered outside wheels.

Figure 5:
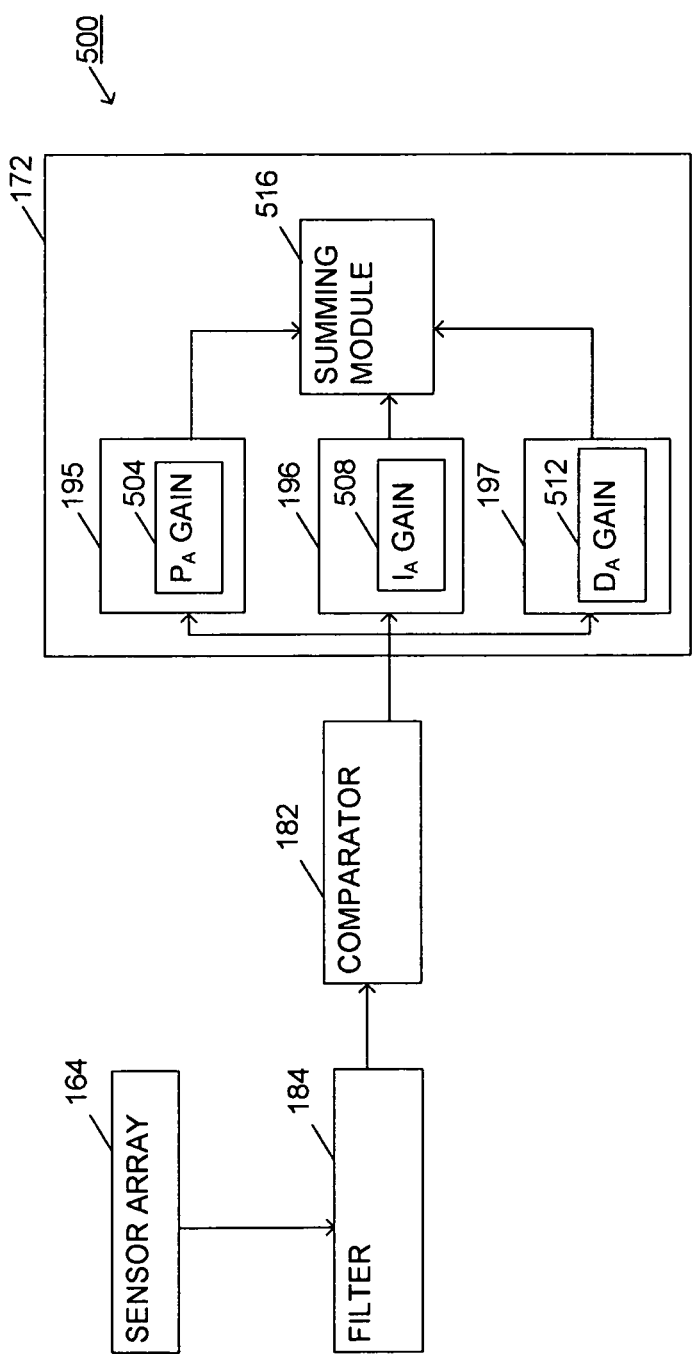
FIG. 5 shows an asymmetric proportional-integral-derivative ("PID") control system that can be applied in the oscillation control system of FIG. 2.

FIG. 5 shows an exemplary asymmetric proportional-integral-derivative ("PID") control system 500 that can be applied in the oscillation control system 200. In FIG. 5 only certain portions of the system 200 are shown. Nonetheless, the portions of system 200 that are not shown in FIG. 5 continue to function within the system 200 as noted earlier.

As noted, the filter module 184 filters a plurality of differences between vehicle conditions and vehicle targets to obtain a plurality of filtered differences. When the vehicle condition is the yaw rate, the plurality of filtered differences represents an oscillation frequency exhibited by the trailer 102 or trailer oscillations. The asymmetric control system 500 attempts to reduce trailer oscillations (by producing appropriate control signals) using the values fed back from the sensor array 164. In some embodiments, the asymmetric control system 500 will attempt to reduce or minimize the trailer oscillations to a steady state having reduced, minimum, or no (zero) oscillations. For example, the asymmetric control system 500 initially compares the plurality of filtered differences with zero to obtain a plurality of control deviations or errors to drive the system 200 or the asymmetric control system 500 to a steady state. When values of the plurality of control errors are above a predetermined threshold (compared in the comparator 182), the system 200 starts an asymmetric braking or damping process. Particularly, the asymmetric control system 500 passes the plurality of control errors through the processor 172 to start damping the oscillations exhibited by the trailer 104. In the embodiment shown, the processor 172 includes a $P_A$ gain module 504 in the proportional controller 195 to control a proportional gain function, an $I_A$ gain module 508 in the integral controller 196 to control an integral gain function, and a $D_A$ gain module 512 in the derivative controller 197 to control a derivative gain function, detailed hereinafter. In one specific embodiment, the $I_A$ gain is a constant, for example, zero. In that specific embodiment, therefore, the asymmetric control system 500 only applies the $P_A$ and $D_A$ gain functions. However, other non-zero $I_A$ gain functions, and linear or non-linear functions can also be used in other embodiments. After the asymmetric control system 500 has applied the $P_A$ and $D_A$ gain functions to the plurality of control errors, a plurality of asymmetric control signals are generated by the summing module 516 of the processor 172. The asymmetric control signals are then fed to the vehicle system 168. For example, in some embodiments, the control signals are provided to the torque control module 194. In turn, the torque control module generates signals to activate a plurality of hydraulic pumps and valves in the hydraulic system 190, which in turn apply pressure at a plurality of brakes of the brake system 192. In other embodiments, such as vehicles equipped with brake-by-wire systems, the brakes may be actuated electrically and the need for the hydraulic system 190 may be reduced or eliminated. In either of these examples, the torque control module 194 determines an amount of torque for each of the wheels 104A, 104B, 104C, and 104D and controls the relevant mechanical system (e.g., the braking system 192, hydraulic system 190, or both) to apply the determined torques at each of the wheels 104A, 104B, 104C and 104D.

In some embodiments, the asymmetric torque is applied or delivered before there is a reversal of trailer oscillation direction to increase an efficiency of the damping process, to eliminate brake latency that can occur during braking, to prevent over-braking, or to prevent excessive oscillation from developing. For example, the asymmetric torque can be further distributed to a number of components depending on the trailer oscillation direction. Particularly, parameters such as the body slip angles from the sensor array 164 are used by the asymmetric control system 500 to distribute the asymmetric torque into two components such as front and rear-wheel torque components to prevent over-braking. In such cases, when the body slip angles exhibited by the rear wheels 104B and 104D approach a predetermined maximum threshold, the torque control module 194 compensates the asymmetric rear-wheel torque applied at the rear wheels 104B and 104D with the asymmetric front-wheel torque.

Figure 6:
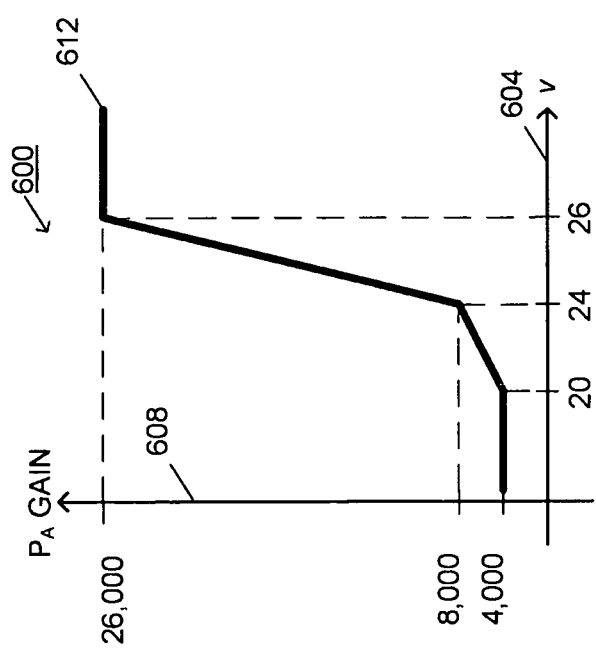
FIG. 6 shows a proportional gain function that can be applied in the asymmetric PID controller of FIG. 5.

FIG. 6 shows an exemplary proportional gain function 600 that can be applied in the asymmetric control system 500 of FIG. 5. Vehicle speed values (in m/s) are measured along an x-axis 604 and $P_A$ gain values (in Nm/rad/s) are measured along a y-axis 608. Particularly, curve 612 represents values of the $P_A$ gain function at different vehicles speeds. Although curve 612 generally represents a piecewise-linear-proportional gain, curve 612 can also be piecewise-non-linear or generally non-linear depending the applications and vehicles at hand. Curve 612 also shows that when the vehicle speed (v) is relatively low, the corresponding $P_A$ gain value is also low. However, curve 612 also shows that a rate of change of the $P_A$ gain values is relatively high after the vehicle speed is greater than a predetermined value. In the embodiment shown, the predetermined value is 24 m/s. Furthermore, before the vehicle 100 reaches a minimum speed, or after the vehicle speed (v) exceeds a maximum speed, the $P_A$ gain value is generally constant. For example, if the vehicle speed (v) is below 20 m/s, the $P_A$ gain value is about 4,000 Nm/rad/s. Once the vehicle speed (v) exceeds the exemplary maximum threshold, the $P_A$ gain value remains at about 26,000 Nm/rad/s. In some embodiments, in other words, the asymmetric control system 500 generally applies some amount of asymmetric braking or torque once the oscillations exhibited by the trailer 102 exceed a pre-determined oscillation threshold, although the amount of asymmetric braking applied can be a minimum and can be discontinued under different circumstances, detailed hereinafter.

Figure 7:
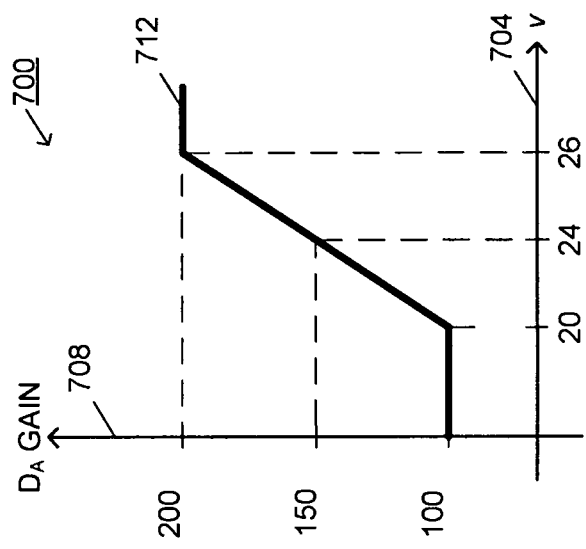
FIG. 7 shows a derivative gain function that can be applied in the asymmetric PID controller of FIG. 5.

FIG. 7 shows an exemplary derivative gain function 700 that can be applied in the asymmetric control system 500 of FIG. 5. Vehicle speed values (in m/s) are measured along an x-axis 704 and $D_A$ gain values (in Nm/rad/s$^2$) are measured along a y-axis 708. Curve 712 represents values of the $D_A$ gain function at different vehicles speeds (v). Although curve 712 generally represents a linear derivative gain, curve 712 can also be piecewise non-linear or generally non-linear depending on the applications and vehicles at hand. Curve 712 therefore also shows that the derivative gain is proportional to the vehicle speed (v). For example, when the vehicle speed (v) is relatively low, the corresponding $D_A$ gain value is also low. Similarly, when the vehicle speed (v) is relatively high, the corresponding $D_A$ gain value is proportionally high. Like the proportional gain function 600, before the vehicle reaches a minimum speed, or after the vehicle speed (v) exceeds a maximum threshold, the $D_A$ gain value remains generally constant. For example, if the vehicle speed (v) is below 20 m/s, the $D_A$ gain value is about 100 Nm/rad/s$^2$. Once the vehicle speed (v) exceeds the exemplary maximum threshold, the $D_A$ gain value remains at about 200 Nm/rad/s$^2$.

Figure 8:
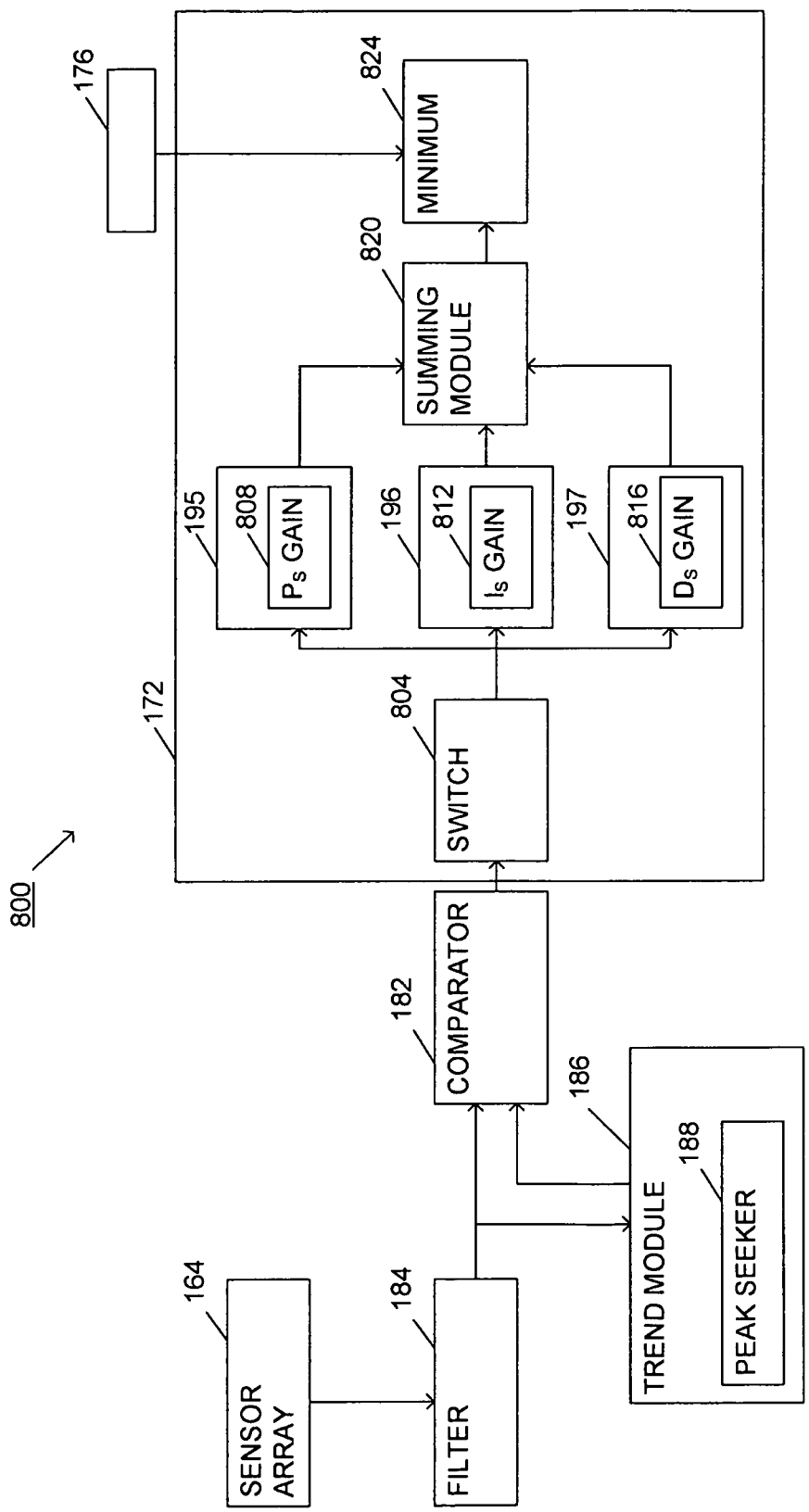
FIG. 8 shows a symmetric PID control system that can be applied in the oscillation control system of FIG. 2.

In addition to applying asymmetric braking, the system 200 can also apply a symmetric torque to reduce the vehicle speed (v) when the trailer 102 oscillates. For example, the system 200 can apply a symmetric torque at all four wheels 104A, 104B, 104C, and 104D to reduce the vehicle speed. Symmetric torque can be generated when the plurality of filtered differences generally satisfy some predetermined conditions. FIG. 8 shows a symmetric PID control system 800 that can be applied in the system 200 of FIG. 2 in a block diagram format to generate symmetric torques. As with FIG. 5, in FIG. 8 only certain portions of the system 200 are shown. Nonetheless, the portions of system 200 that are not shown in FIG. 8 continue to function within the system 200 as noted earlier.

A plurality of filtered differences between vehicle conditions and vehicle targets from the sensor array 164 are obtained or generated by the filter 184. The peak seeker 188 determines a maximum value of the filtered differences. The symmetric control system 800 compares the plurality of the filtered differences with the maximum value of the filtered differences at the comparator 182. When the plurality of the filtered differences is less than the maximum value of the filtered differences at the comparator 182, the trailer 102 is considered to be oscillating less. The symmetric control system 800 then activates a switch 804 to enter a symmetric braking process, detailed hereinafter. However, when the plurality of the filtered differences is greater than the maximum value of the filtered differences at the comparator 182, the trailer 102 is considered to be oscillating more. As a consequence, the symmetric control system 800 activates the switch 804 to enter the asymmetric braking process as described.

In other embodiments, the trend module 186 determines a trend of the plurality of the filtered differences, for example, by determining a rate of change of the plurality of the filtered differences. When the rate of change is non-negative, the oscillations are considered to have an increasing trend. In such cases, the symmetric control system 800 communicates with the asymmetric control system 500 through the switch 804 to carry out the asymmetric braking process to generate efficient torque to stabilize trailer oscillations as described. On the other hand, when the rate of change is negative, the oscillations are considered to have a decreasing trend, and the symmetric control system 800 activates the switch 804 to enter a symmetric braking process to slow down the vehicle 100 as follows.

In the symmetric braking process, the symmetric control system 800 passes the plurality of control errors through the processor 172 to start damping the oscillations exhibited by the trailer 102. In the embodiment shown, the processor 172 includes a $P_S$ gain module 808 in the proportional controller 195 to control a symmetric proportional gain function, an $I_S$ gain module 812 in the integral controller 196 to control a symmetric integral gain function, and a $D_S$ gain module 816 in the derivative controller 197 to control a symmetric derivative gain function, detailed hereinafter. In one specific embodiment, the $I_S$ and $D_S$ gains are constants, for example, zero, whereas the $P_S$ gain is a non-zero constant such as 400 ms$^2$/rad/s. That is, the symmetric control system 800 only applies the constant $P_S$ gain function to the plurality of control errors. However, other non-zero $P_S$, $I_S$, and $D_S$ gain functions, and linear or non-linear functions can also used in other embodiments.

After the symmetric control system 800 has applied the $P_S$ gain function to the plurality of control errors, a plurality symmetric control signals are generated by the summing module 820 and compared with a minimum symmetric torque 824 retrieved from the memory 176. In some embodiments, the minimum symmetric torque is about −0.5 m/s$^2$. In this way, the symmetric control system 800 can apply a minimum symmetric torque to reduce or minimize the brake latency and to prepare for any asymmetric braking if necessary. The symmetric control signals are then fed to the vehicle system 168 to actuate components such as the hydraulic system 190 and the torque control module 194, or a combination thereof, to distribute or apply continuous symmetric torque or braking.

Furthermore, in some embodiments, when the plurality of the filtered differences are increasing, or when the oscillations have an increasing trend, portions of the symmetric braking signals are altered to accommodate some asymmetric braking to increase damping efficiency. For example, the symmetric control system 800 can reduce values of the symmetric control signals to reduce braking at the inside wheels 104A and 104B. While the symmetric control system 800 is reducing the values of the symmetric control signals, the symmetric control system 800 also communicates with the system 200 to increase the asymmetric control signals at the outside wheels 104C and 104D. In this way, the system 200 can increase or maximize a counter-torque to stabilize the vehicle 100, and reduce or minimize trailer oscillations and yaw moments.

When the plurality of the filtered differences are decreasing, or when the oscillations have a decreasing trend, portions of the symmetric control signals are also altered to accommodate some asymmetric braking to increase damping efficiency. For example, the symmetric control system 800 can increase the values of the symmetric control signals to increase braking at the outside wheels 104A and 104B. While the symmetric control system 800 is increasing the values of the symmetric control signals, the symmetric control system 800 also communicates with the system 200 to decrease the asymmetric control signals at the inside wheels 104C and 104D. In this way, the system 200 can also increase or maximize the counter-torque to stabilize the vehicle 100, and reduce or minimize trailer oscillations and yaw moments.

Figure 9:
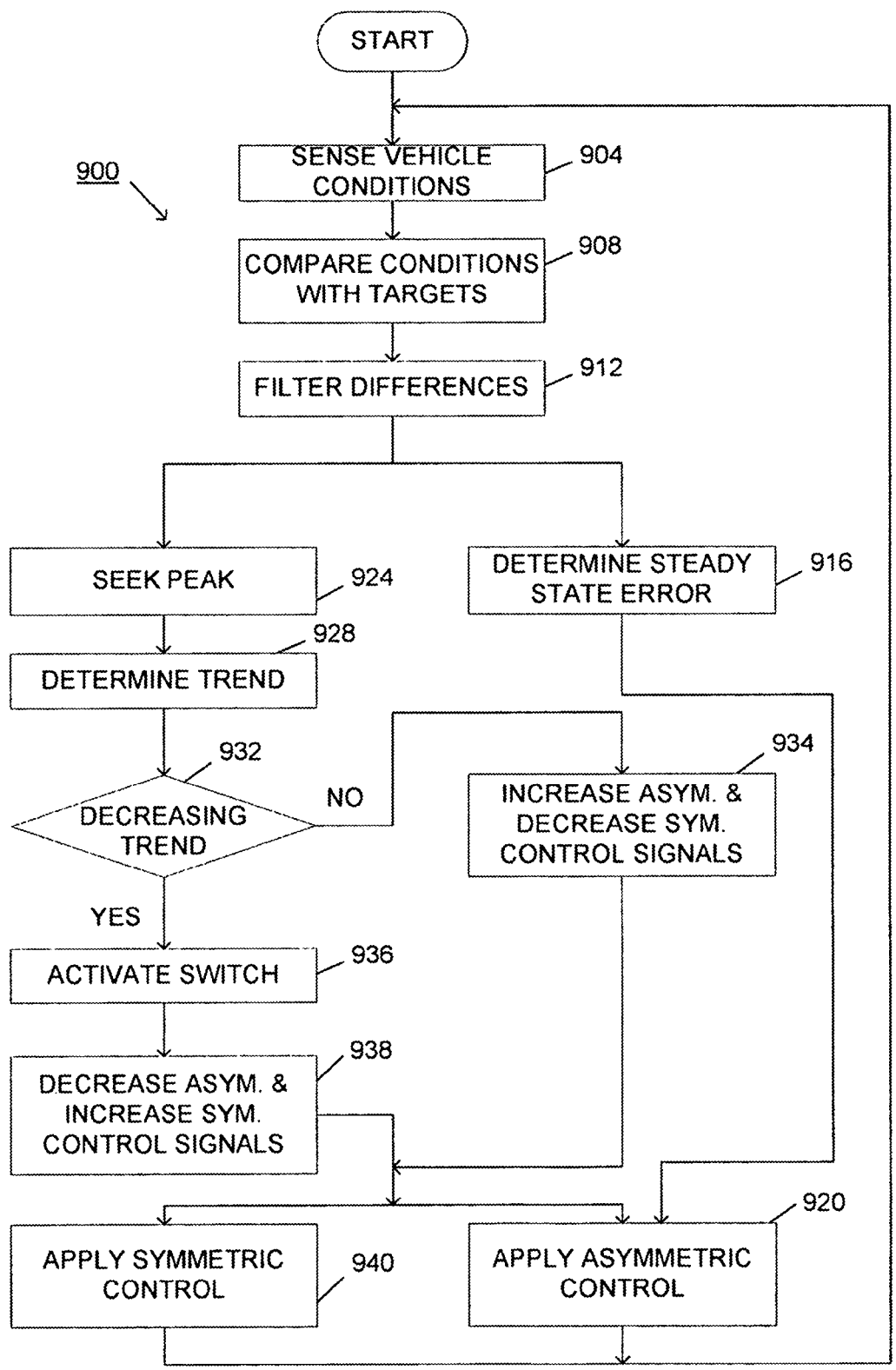
FIG. 9 is a flow chart of an oscillation control process according to an embodiment of the invention.

FIG. 9 is a flow chart of an oscillation control process 900 that occurs in some constructions, including processes that may be carried out by software, firmware, or hardware. As noted, the sensor array 164 senses a plurality of vehicle conditions such as yaw rates at block 904 as described. The system 200 then compares the plurality of vehicle conditions with a plurality of vehicle targets at block 908 to obtain a plurality of differences. In some embodiments, the plurality of differences represent a plurality of yaw rate errors between the target yaw rates and the yaw rates exhibited by the vehicle 100. The system 200 then filters the plurality of differences to obtain a plurality of filtered differences at block 912. The system 200 continues to determine a steady state error at block 916, as described earlier. Based on the steady state error, the system 200 applies asymmetric control at block 920 to the vehicle system 168 (of FIG. 2).

The system 200 also determines a maximum value or a peak of the plurality of filtered differences at block 924. Based on the peak, the system 200 determines a trend of the plurality of filtered differences at block 928. If the trend of the plurality of filtered differences indicates an increasing trend as determined at block 932, the processor 172 alters the asymmetric and symmetric control signals to be applied at the wheels 104A, 104B, 104C, and 104D at block 934, as described. However, if the trend of the plurality of filtered differences indicates a decreasing trend as determined at block 932, the processor 172 switches to activate symmetric braking at block 936, and also alters the asymmetric and symmetric control signals applied at the wheels 104A, 104B, 104C, and 104D at block 938, as described. Thereafter, the system 200 applies the respective processes carried out by the symmetric control system 800 at block 940, and by the asymmetric control system 500 at block 920, as described.

Various features and advantages of the invention are set forth in the following claims.

What is claimed is:

1. A method of controlling a towing vehicle connected to a vehicle trailer, the method comprising:
    determining a set of vehicle targets for the towing vehicle, the set of vehicle targets including a plurality of target values each corresponding to a different one of a plurality of vehicle sensors positioned on the towing vehicle;
    sensing a set of vehicle conditions indicative of movements exhibited by the towing vehicle caused by the vehicle trailer, the set of vehicle conditions including a plurality of condition values each sensed by a different one of the plurality of vehicle sensors;
    determining a plurality of differences between the set of vehicle targets and the set of vehicle conditions;
    determining a trend of the plurality of differences;
    determining, by a symmetric braking control system, a symmetric force to apply to the vehicle based at least in part on the set of vehicle targets and the set of vehicle conditions;
    determining, by an asymmetric braking control system, an asymmetric force to apply to the vehicle based at least in part on the set of vehicle targets and the set of vehicle conditions;
    selecting between the symmetric control system and the asymmetric control system based on the trend; and
    actuating a vehicle system according to the selected symmetric control system or the asymmetric control system to apply the symmetric force or the asymmetric force to the towing vehicle to decrease the plurality of differences.

2. The method of claim 1, wherein determining a trend of the plurality of differences comprises:

determining a rate of change of the plurality of differences as compared to a previous plurality of differences;
indicating the trend to be increasing when the rate of change comprises a positive value; and
indicating the trend to be decreasing when the rate of change comprises a negative value.

3. The method of claim 1, wherein determining a trend of the plurality of differences comprises:
determining a peak value from a previous plurality of differences;
indicating the trend to be increasing when one of the plurality of differences is above the peak value; and
indicating the trend to be decreasing when all of the plurality of differences are less than the peak value.

4. The method of claim 1, wherein selecting between the symmetric control system and the asymmetric control system comprises:
selecting the asymmetric control system when the trend indicates increasing differences, between the set of vehicle targets and the set of vehicle conditions; and
selecting the symmetric control system when the trend indicates decreasing differences between the set of vehicle targets and the set of vehicle conditions.

5. The method of claim 1, wherein actuating a vehicle system comprises applying at least one of a symmetric braking and an asymmetric braking based on the selected control system.

6. The method of claim 1, further comprising band-pass filtering the plurality of differences, and wherein determining a trend comprises determining a trend of the plurality of filtered differences.

7. The method of claim 1, wherein actuating a vehicle system comprises generating at least one of a symmetric torque and an asymmetric torque based on the selected control system.

8. A system for controlling a towing vehicle connected to a vehicle trailer, the system comprising:
a plurality of sensors positioned on the towing vehicle configured to sense a set of vehicle conditions indicative of movements exhibited by the towing vehicle caused by the vehicle trailer, the set of vehicle conditions including a plurality of condition values each sensed by a different one of the plurality of vehicle sensors;
a comparator configured to determine a plurality of differences between the set of vehicle conditions and a set of vehicle targets, the set of vehicle targets including a plurality of target values each corresponding to a different one of the plurality of vehicle sensors;
a trend module configured to determine a trend of the plurality of differences;
a symmetric control system configured to determine a symmetric force to apply to the vehicle based at least in part on the set of vehicle targets and the set of vehicle conditions;
an asymmetric control system configured to determine an asymmetric force to apply to the vehicle based at least in part on the set of vehicle targets and the set of vehicle conditions;
a switch configured to select between the symmetric control system and the asymmetric control system based on the trend; and
a vehicle system configured to be actuated by the selected control system to apply the symmetric force or the asymmetric force to the towing vehicle.

9. The system of claim 8, wherein the trend comprises a rate of change of the plurality of differences, and wherein the system is further configured to indicate the trend to be increasing when the rate of change comprises a positive value, and to indicate the trend to be decreasing when the rate of change comprises a negative value.

10. The system of claim 8, wherein the trend module comprises a peak seeker configured to determine a peak value of the plurality of differences, and wherein the controller is further configured to indicate the trend to be increasing when one of the plurality of differences is above a previously determined peak value, and to indicate the trend to be decreasing when all of the plurality of differences are less than the previously determined peak value.

11. The system of claim 8, wherein the switch is further configured to select the asymmetric control system when the trend indicates increasing differences between the set of vehicle conditions and the set of vehicle targets, and to select the symmetric control system when the trend indicates decreasing differences between the set of vehicle conditions and the set of vehicle targets.

12. The system of claim 8, wherein the vehicle system comprises a hydraulic braking system, and wherein the hydraulic braking system is configured to apply symmetric braking or asymmetric braking based on the selected control system.

13. The system of claim 8, further comprising a band-pass filter configured to filter the plurality of differences, and wherein the system is further configured to determine the trend of the plurality of differences based on the plurality of filtered differences.

14. The system of claim 8, wherein the vehicle system comprises a hydraulic system, and wherein the hydraulic system is configured to generate symmetric torque or asymmetric torque for the towing vehicle based on the selected control system.

15. A method of controlling a towing vehicle connected to a vehicle trailer, the method comprising:
determining a set of vehicle targets for the towing vehicle, the set of vehicle targets including a plurality of target values each corresponding to a different one of a plurality of vehicle sensors positioned on the towing vehicle;
sensing a set of vehicle conditions indicative of movements exhibited by the towing vehicle caused by the vehicle trailer, the set of vehicle conditions including a plurality of condition values each sensed by a different one of the plurality of vehicle sensors;
determining a plurality of differences between the set of vehicle targets and the set of vehicle conditions;
determining a trend of the plurality of differences;
determining a switching signal based on the trend; and
selectively applying either symmetric braking or asymmetric braking based on the switching signal to decrease the plurality of differences.

16. The method of claim 15, further comprising determining a model of the towing vehicle based on a plurality of dynamics, wherein the model comprises at least one of a proportional-integral-derivative ("PID") controller model, a proportional controller model, a proportional-derivative ("PD") controller model, a proportional-integral ("PI") controller model, a filtering model, a trend model, a comparison model, and a peak seeking model.

17. The method of claim 16, further comprising:
determining a plurality of differences between the set of vehicle targets and the set of vehicle conditions with the comparison model;
determining a peak value of the plurality of differences with the peak seeking model;
filtering the plurality of differences with the filtering model;

determining the trend of the plurality of differences with the trend model; and determining the switching signal with one of the PID controller model, the proportional controller model, the PD controller model, and the PI controller model.

18. The method of claim 16, wherein the plurality of dynamics of the towing vehicle comprise a wheel speed, a steering angle, a yaw rate, a body slip angle, a lateral acceleration, a front wheel torque, and a rear wheel torque.

19. The method of claim 15, further comprising:
determining a peak value from a previous plurality of differences;
indicating an increasing trend when one of the plurality of differences is above the peak value; and
indicating a decreasing trend when all of the plurality of differences are less than the peak value.

20. The method of claim 19, wherein determining the switching signal comprises:
generating an asymmetric signal when the trend comprises an increasing trend; and
generating a symmetric signal when the trend comprises a decreasing trend.

21. The method of claim 15, further comprising:
determining a rate of change of the plurality of differences;
indicating an increasing trend when the rate of change comprises a positive value; and
indicating a decreasing trend when the rate of change comprises a negative value.

22. The method of claim 15, wherein selectively applying at least one of a symmetric braking and an asymmetric braking comprises generating at least one of a symmetric torque and an asymmetric torque.

23. The method of claim 15, further comprising
determining, by a symmetric braking control system, a symmetric force to apply to the vehicle based at least in part on the set of vehicle targets and the set of vehicle conditions; and
determining, by an asymmetric braking control system, an asymmetric force to apply to the vehicle based at least in part on the set of vehicle targets and the set of vehicle conditions,
wherein determining a switching signal based on the trend includes determining a switching signal that switches between the symmetric braking control system and the asymmetric braking control system, and
wherein selectively applying either symmetric braking or asymmetric braking includes controlling a vehicle system according to either the symmetric braking control system or the asymmetric braking control system based on the switching signal.

24. The method of claim 23, wherein the symmetric braking control system is a first proportional-integral-derivative ("PID") controller and the asymmetric braking control system is a second proportional-integral-derivative ("PID") controller.

* * * * *